United States Patent
An et al.

(10) Patent No.: US 10,612,646 B2
(45) Date of Patent: Apr. 7, 2020

(54) VEHICLE INCLUDING TRANSMISSION APPARATUS

(71) Applicants: HYUNDAI MOTOR COMPANY, Seoul (KR); KIA MOTORS CORPORATION, Seoul (KR)

(72) Inventors: Daeyun An, Anyang-si (KR); Seunghyun Woo, Seoul (KR); Gi Beom Hong, Bucheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 54 days.

(21) Appl. No.: 15/833,269

(22) Filed: Dec. 6, 2017

(65) Prior Publication Data
US 2019/0113130 A1    Apr. 18, 2019

(30) Foreign Application Priority Data
Oct. 16, 2017    (KR) .................. 10-2017-0133828

(51) Int. Cl.
*F16H 59/02*    (2006.01)
*F16H 59/08*    (2006.01)

(52) U.S. Cl.
CPC ......... *F16H 59/0278* (2013.01); *F16H 59/08* (2013.01); *F16H 2059/0221* (2013.01)

(58) Field of Classification Search
CPC .......... F16H 59/0217; F16H 2059/026; F16H 2059/0271; F16H 2059/0221; F16H 2059/0239; F16H 2059/081; F16H 59/10; G05G 1/06; G05G 1/10; G05G 5/03; B60K 20/04

USPC ..... 74/473, 473.34, 473.35; 200/11 R, 61.88
See application file for complete search history.

(56) References Cited

U.S. PATENT DOCUMENTS

| | | | | |
|---|---|---|---|---|
| 5,142,928 A | * | 9/1992 | Buti | B60K 20/02 74/335 |
| 5,902,006 A | * | 5/1999 | Janker | B60R 13/02 180/315 |
| 6,053,071 A | * | 4/2000 | Vazquez, Jr. | F16H 59/0278 150/155 |
| 6,694,838 B2 | * | 2/2004 | Ersoy | B60R 25/24 74/473.1 |
| 6,993,994 B2 | * | 2/2006 | Giefer | F16H 59/105 192/219.5 |
| 7,137,475 B2 | * | 11/2006 | Shiomi | F16H 59/105 180/315 |

(Continued)

FOREIGN PATENT DOCUMENTS

JP    2003-005851 A    1/2003
JP    2014-113888 A    6/2014

(Continued)

*Primary Examiner* — Bobby Rushing, Jr.
(74) *Attorney, Agent, or Firm* — Morgan, Lewis & Bockius LLP

(57) ABSTRACT

A vehicle includes a transmission lever for receiving a change speed command and including a knob, and a transmission apparatus for changing a speed of the vehicle according to the change speed command received by the transmission lever, wherein the transmission lever is located at any one gear position among a reverse (R) gear position, a neutral (N) gear position and a driving (D) gear position, and a shape of the knob is changed according to the gear position at which the transmission lever is located.

10 Claims, 16 Drawing Sheets

(56) References Cited

U.S. PATENT DOCUMENTS

| | | | | |
|---|---|---|---|---|
| 7,895,917 B2* | 3/2011 | Embach | ............... | B62D 1/06 |
| | | | | 74/552 |
| 9,476,501 B2* | 10/2016 | Wang | ............... | F16H 59/105 |
| 2018/0321703 A1* | 11/2018 | Gandhi | ............... | G05G 1/06 |

FOREIGN PATENT DOCUMENTS

| KR | 10-0144526 B1 | 8/1998 |
|---|---|---|
| KR | 10-2002-0097312 A | 12/2002 |
| KR | 10-2003-0016840 | 3/2003 |

* cited by examiner

VEHICLE INCLUDING TRANSMISSION APPARATUS

CROSS-REFERENCE TO RELATED APPLICATION

This application claims the benefit of priority of Korean Patent Application No. 10-2017-0133828, filed on Oct. 16, 2017 with the Korean Intellectual Property Office, the entire disclosure of which is incorporated herein by reference.

TECHNICAL FIELD

Exemplary embodiments of the present disclosure relate to a vehicle transmission apparatus, and more particularly, to a vehicle transmission apparatus which allows a driver to check a current gear position without line-of-sight dispersion while traveling so as to improve convenience of the driver.

BACKGROUND

Generally, a transmission is an apparatus configured to adjust a ratio of torque to rotational speed of an engine output suitable to a running state of a vehicle and, to transfer the rotating force and speed to driving wheels, and may be classified into manual transmissions and automatic transmissions.

A driver who drives a vehicle may operate a transmission lever installed on a console surface or handle around the driver to change a gear position of a manual transmission or an automatic transmission to a gear position desired by the driver.

A manual transmission may operate such that when a driver selects a gear suitable to a running state of a vehicle using a transmission lever, movement of a vehicle desired by the driver is conveyed to the transmission through a cable or rod. An automatic transmission may operate such that when a driver moves a transmission lever, movement of a vehicle desired by the driver is informed to the transmission by an inhibitor switch being driven using a cable or other conveying device.

A shift-by-wire (SBW) type transmission lever has been used in recent vehicles. The SBW type transmission lever may receive a change speed command through various manipulation methods, unlike a conventional mechanical transmission lever.

Unlike a mechanical transmission lever, the SBW type transmission lever has an advantage in that there is no mechanical connection structure and a lever manipulation force or sensation is excellent, and thus manipulation thereof is easy.

Types of SBW type transmission levers include a lever type transmission lever operated through a method in which a driver operates a transmission lever protruding from a console surface of a vehicle in a front-rear direction, a dial type transmission lever operated through a method in which a driver rotates a cylindrically shaped transmission lever installed on a console surface of a vehicle in a lateral direction, a column type transmission lever operated through a method in which a driver operates a transmission lever installed on a side surface of a handle in a vertical direction, a button type transmission lever operated through a method in which a driver pushes a button on which a gear position of a vehicle is displayed, and the like.

SUMMARY

Therefore, it is an aspect of the present disclosure to provide a vehicle including a transmission apparatus which allows a driver to check a current gear position using only a sense of touch.

It is another aspect of the present disclosure to provide a vehicle including a transmission apparatus of which a shape of a transmission lever is changed according to a gear change.

It is still another aspect of the present disclosure to provide a vehicle including a transmission apparatus which allows a driver to grip a transmission lever in order to check a current gear position without line-of-sight dispersion.

Additional aspects of the disclosure will be set forth in part in the description which follows and, in part, will be obvious from the description, or may be learned by practice of the disclosure.

In accordance with one aspect of the present disclosure, a vehicle includes a transmission lever provided to receive a change speed command and including a knob, and a transmission apparatus configured to change a speed of the vehicle according to the change speed command received by the transmission lever, wherein the transmission lever is located at any one gear position among a reverse (R) gear position, a neutral (N) gear position, and a driving (D) gear position, and a shape of the knob is changed according to the gear position at which the transmission lever is located.

A cross-sectional shape of the knob may be changed on the basis of the gear position at which the transmission lever is located.

The transmission lever may include a driving motor configured to provide a driving force, and a moving shaft connected to the driving motor and provided to be movable in a first direction or a second direction opposite the first direction.

The first direction and the second direction may include a clockwise direction or a counterclockwise direction.

When the transmission lever is located at any one gear position among the R gear position, the N gear position, and the D gear position, the moving shaft may be provided to be located at corresponding one among a first position, a second position, and a third position.

The moving shaft may be provided with a plurality of moving shafts.

The transmission lever may further include an elastic cover configured to cover the moving shaft and form the knob together with the moving shaft.

The transmission lever may include a fixed gear connected to the driving motor and configured to rotate about a fixed axis, and a moving gear engaged with the fixed gear, coupled to one end of the moving shaft, and configured to rotate about a moving axis together with the moving shaft.

The vehicle may further include a change button configured to receive a parking (P) change speed command and separated from the transmission lever.

In accordance with another aspect of the present disclosure, a vehicle includes a transmission lever configured to receive a change speed command and including a knob, and a transmission apparatus configured to change a speed of the vehicle according to the change speed command received by the transmission lever, wherein the transmission lever is located at any one among an R gear position, an N gear position, and a D gear position, and the knob moves on the basis of the gear position at which the transmission lever is located.

The transmission lever may further include a driving motor configured to provide a driving force, and the knob is provided to move due to the driving force of the driving motor.

The knob may be provided to move forward or backward on the basis of the gear position at which the transmission lever is located.

The vehicle may further include a change button configured to receive a P change speed command and separated from the transmission lever.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
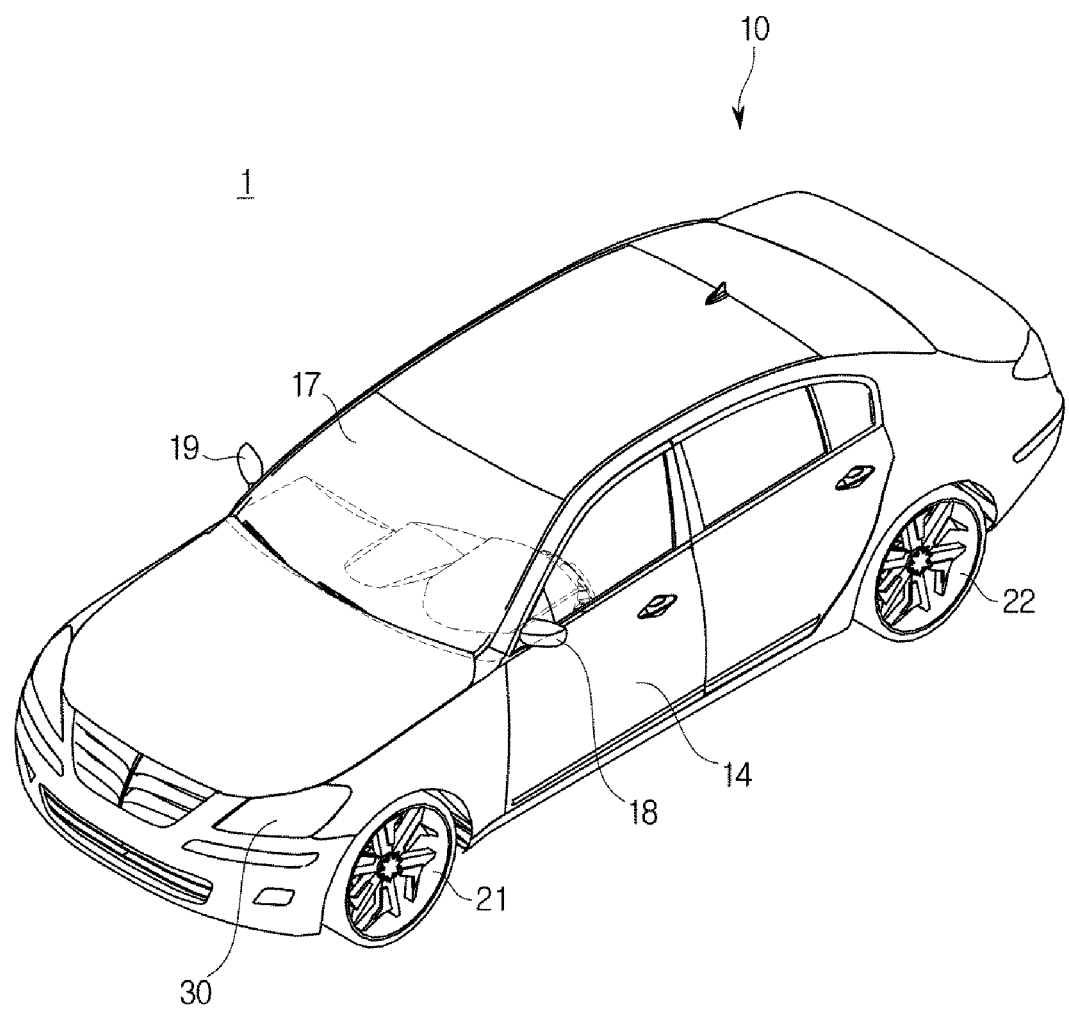
FIG. 1 is a view illustrating an exterior of a vehicle according to exemplary embodiments of the present disclosure.

Embodiments described in this specification and configurations illustrated in the accompanying drawings are only exemplary examples of the disclosed disclosure. The disclosure covers various modifications that may be substituted for the embodiments and drawings herein at a time of filing this application.

In addition, the same reference numerals or symbols refer to parts or components that substantially perform the same function.

In addition, terms used in the present specification are merely used to describe the exemplary embodiments and are not intended to limit and/or restrict the embodiments. An expression used in the singular encompasses the expression of the plural unless the expression has a clearly different meaning in context. In the present specification, the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

In addition, it should be understood that, although the terms "first," "second," and the like may be used herein to describe various elements, the elements are not limited by these terms. The terms are only used to distinguish one element from another. For example, a first element could be termed a second element, and, similarly, a second element could be termed a first element without departing from the scope of the present disclosure. As used herein, the term "and/or" includes any and all combinations of one or more of the associated listed items.

Meanwhile, the terms used in the specification, such as "front end," "back end," "upper portion," "lower portion," "upper end," and "lower end" are defined on the basis of the drawings, and shapes and positions of components are not limited by the terms.

In the following description, a vehicle refers to various apparatuses which move an object such as a person, a thing, or an animal to be transported from a starting point to a destination. The vehicle may include a vehicle which travels on a road or track, a vessel which moves over a sea or river, an aircraft, and the like.

In addition, the vehicle which travels on the road or track may move in a predetermined direction according to a rotation of at least one wheel thereof, and may include, for example, three- or four-wheeled vehicles, construction machines, two-wheeled motorcycles, prime movers, bicycles, and trains that run on a track.

Hereinafter, exemplary embodiments according to the present disclosure will be described in detail with reference to the accompanying drawings.

FIG. 1 is a view illustrating an exterior of a vehicle according to exemplary embodiments of the present disclosure.

As illustrated in FIG. 1, a vehicle according to exemplary embodiments includes a main body 10 forming an exterior of a vehicle 1, wheels 21 and 22 configured to move the vehicle 1, doors 14 configured to shield an inside of the vehicle 1 from the outside, a front glass 17 configured to provide a front view of the vehicle 1 to a driver inside the vehicle 1, and side mirrors 18 and 19 configured to provide a rear view of the vehicle 1 to the driver.

The wheels 21 and 22 may include front wheels 21 provided at the front of the vehicle and rear wheels 22 provided at the rear of the vehicle, and the front wheels 21 or the rear wheels 22 may receive a rotating force from a driving device 700, which will be described below, and move the main body 10 in a front-rear direction.

The doors 14 are rotatably provided at right and left sides of the main body 10, allow a driver to enter the vehicle 1 when the doors are open, and shield the inside of the vehicle 1 from the outside when the doors are closed.

The front glass 17 is provided at an upper front side of the main body 10, allows the driver inside the vehicle 1 to obtain visual information from the front of the vehicle 1, and is also referred to as a windshield glass.

In addition, the side mirrors 18 and 19 may include a left side mirror 18 provided at a left of the main body 10 and a right side mirror 19 provided at a right thereof and allow the driver inside the vehicle 1 to obtain visual information from beside and behind the vehicle 1.

In addition, lamps 30 for securing visibility and informing other vehicles of a travel path of the subject vehicle may be provided at a front surface and/or a rear surface of the vehicle.

Figure 2:
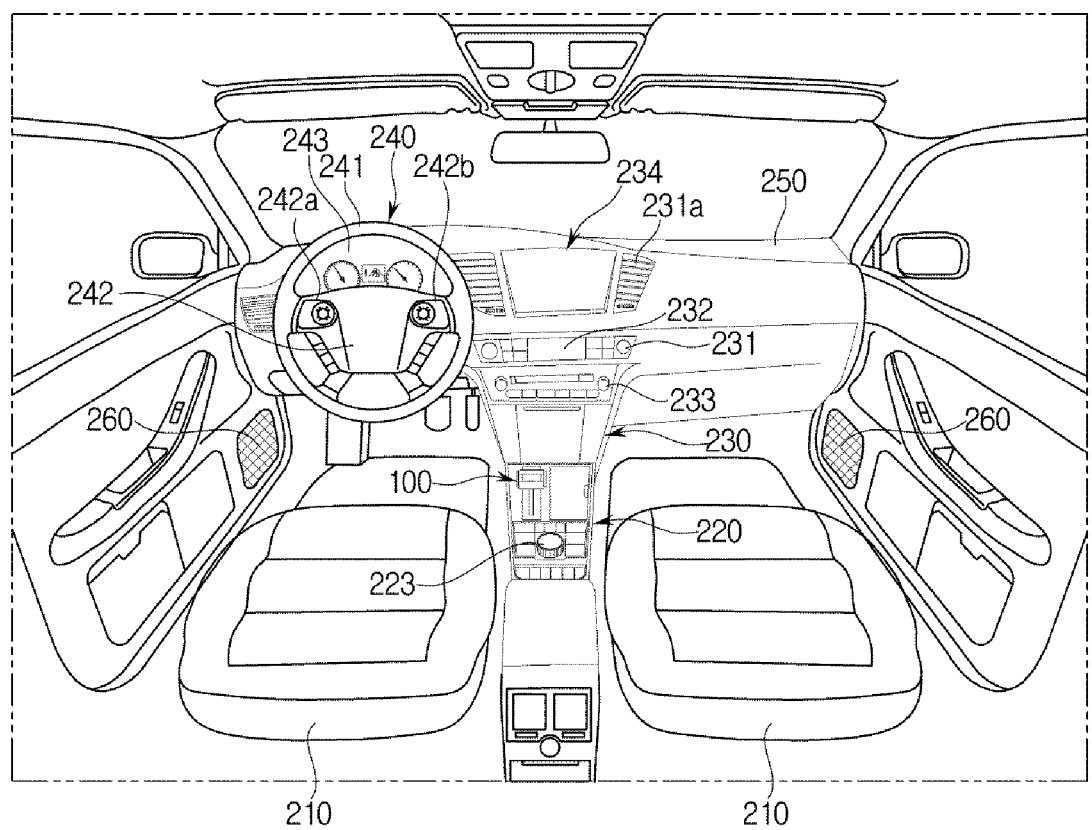
FIG. 2 is a view illustrating an internal configuration of a vehicle according to exemplary embodiments of the present disclosure.

FIG. 2 is a view illustrating an interior of the vehicle according to exemplary embodiments of the present disclosure.

As illustrated in FIG. 2, the vehicle 1 may include seats 210 on which the driver and the like sit and a dashboard 250 in which a gear box 220, a center fascia 230, a steering wheel 240 and the like are provided.

The steering wheel 240 provided on the dashboard 250 is an apparatus for adjusting a running direction of the vehicle 1, and may include a rim 241 gripped by the driver and a spoke 242 connected to a steering apparatus of the vehicle 1 and configured to connect the rim 241 and a hub of a rotating shaft for steering. In some embodiments, operating apparatuses 242a and 242b for controlling various devices, for example, an audio device in the vehicle 1, may be formed in the spoke 242.

A cluster 243 may display a speed gage configured to show a speed of the vehicle and a revolutions-per-minute (RPM) gage configured to show an RPM of the engine. The driver may check vehicle information related to the vehicle at a glance. In addition, the cluster 243 may display information related to the vehicle 1, and particularly, information related to running of the vehicle 1. For example, the cluster 243 may display information such as a possible remaining running distance based on the amount of gas remaining, navigation information, audio information and the like.

The cluster 243 may be provided at a region facing the steering wheel 240 in a region of the dashboard 250 such that the driver may check information related to the vehicle without excessively turning his or her eyes from a forward position while traveling.

Although not illustrated in the drawing, a head up display (HUD) configured to display visual information provided to the driver on the front glass 17 may also be provided on the dashboard 250.

An air conditioner 231, a clock 232, an audio device 233, a display 234 and the like may be installed in the center fascia 230 provided in the dashboard 250.

The air conditioner 231 adjusts a temperature, humidity, an air cleanliness, and an air flow inside the vehicle 1 to keep the inside of the vehicle 1 pleasant. The air conditioner 231 may include at least one discharge port 231a installed in the center fascia 230 and configured to discharge air. A button, a dial, or the like for controlling the air conditioner 231 and the like may be installed in the center fascia 230. An occupant such as the driver may control the air conditioner 231 using the button disposed in the center fascia 230.

The clock 232 may be provided around the button or dial for controlling the air conditioner 231.

The audio device 233 may include an operation panel on which a plurality of buttons for performing functions of the audio device 233 is provided. The audio device 233 may provide a radio mode in which a radio function is provided, and a media mode in which an audio file of various storage media configured to store audio files is reproduced.

The audio device 233 may acoustically output an audio file through the speaker 260. In FIG. 2, an example of the speaker 260 is provided inside the door, but a position at which the speaker 260 is provided is not limited thereto.

The display 234 may display various pieces of information directly or indirectly related to the vehicle. For example, the display 234 may display direct information such as navigation information of the vehicle and state information of the vehicle, and indirect information such as pictures received from the inside and outside of the vehicle and multimedia information including moving pictures.

To this end, the display 234 may be realized as a liquid crystal display (LCD), a light emitting diode (LED) display, a plasma display panel (PDP) display, an organic light emitting diode (OLED) display, a cathode ray tube (CRT) display, and the like, but is not limited thereto.

A transmission lever 100 for changing a speed, or ratio, of the vehicle 1 and a dial operator 223 for controlling a function of the vehicle 1 may be installed in the gear box 220.

Hereinafter, the transmission lever 100 will be described in detail.

Figure 3:
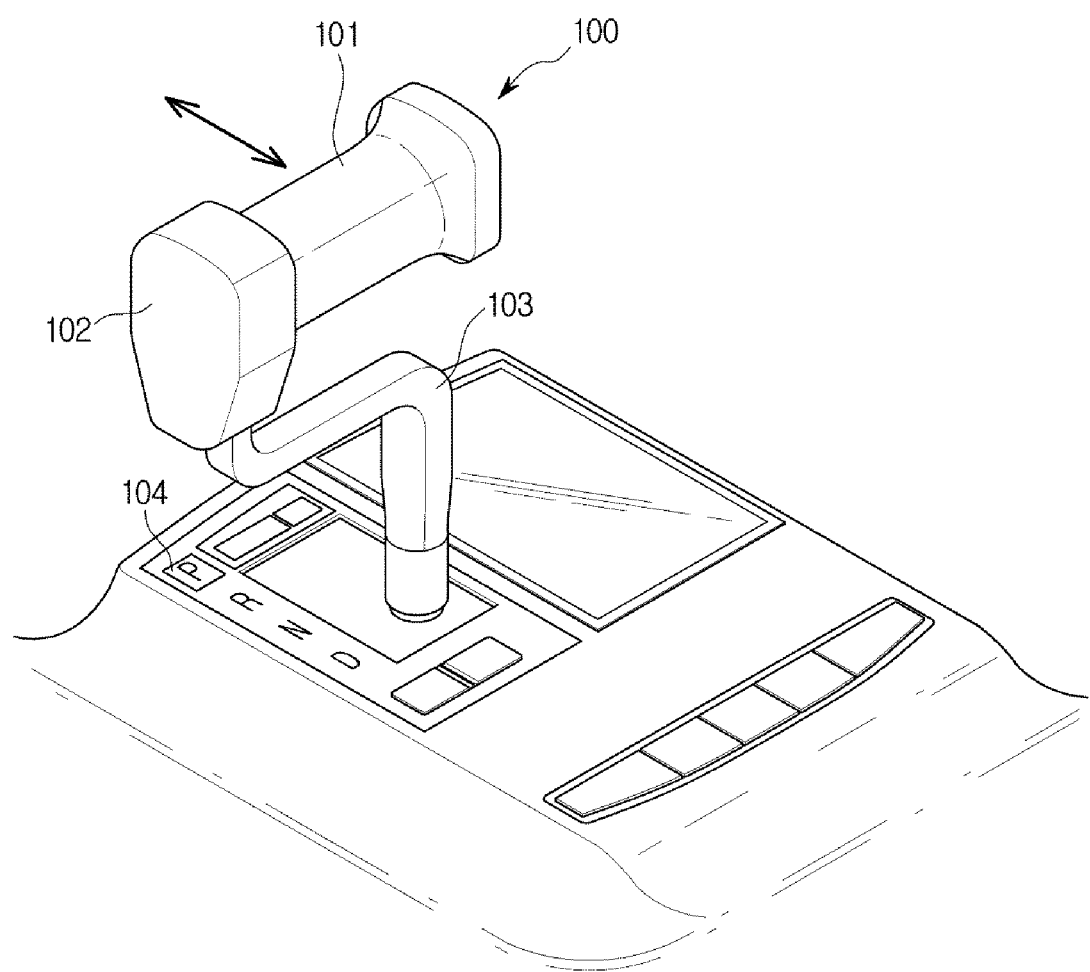
FIG. 3 is a view illustrating a transmission lever of a vehicle according to exemplary embodiments of the present disclosure.
Figure 4:
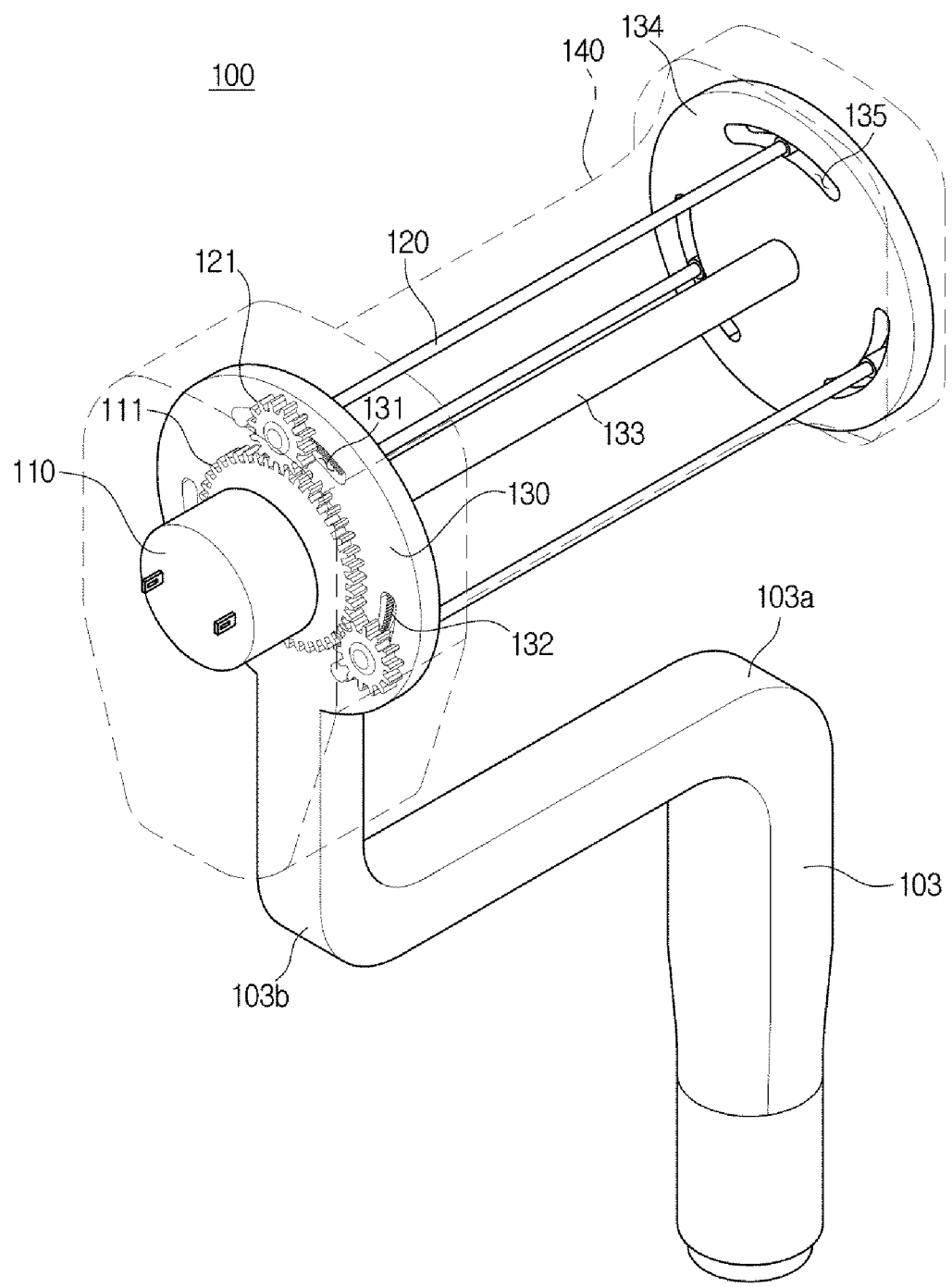
FIG. 4 is a view illustrating an internal structure of the transmission lever of FIG. 3.
Figure 5:
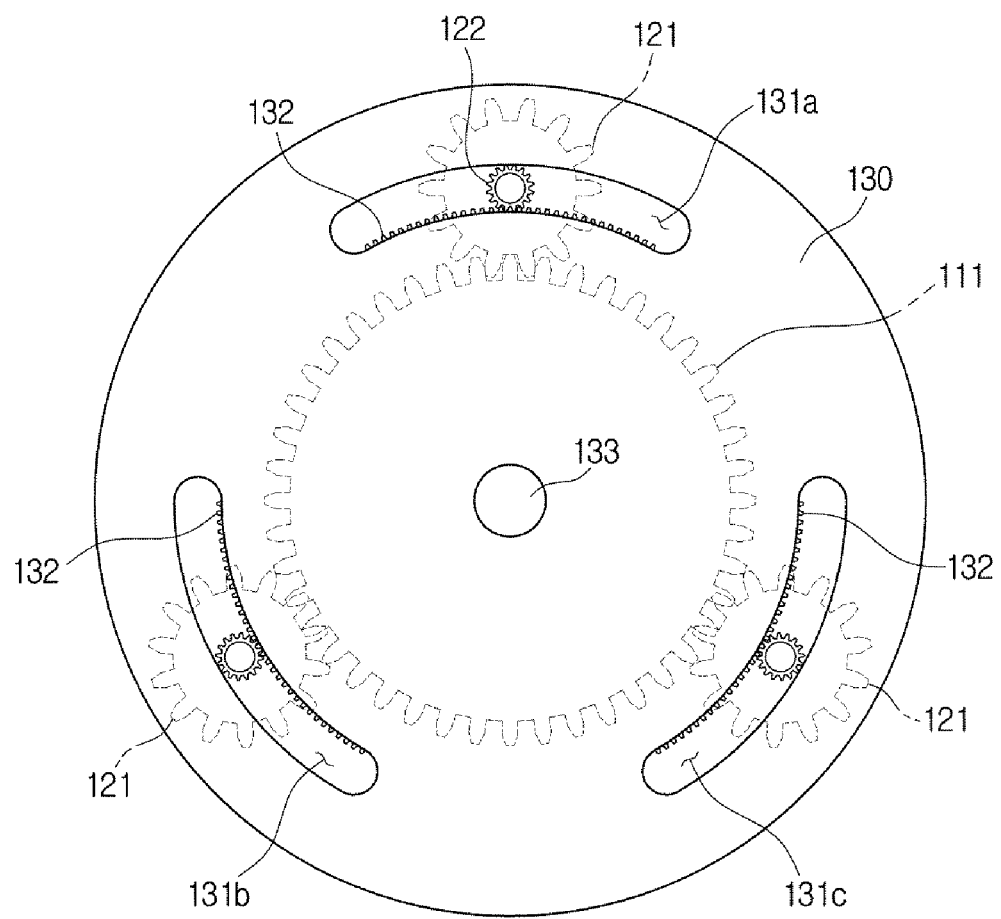
FIG. 5 is a view illustrating a guide of FIG. 4 from a different angle than that shown in FIG. 4.

FIG. 3 is a view illustrating the transmission lever of the vehicle according to exemplary embodiments of the present disclosure, FIG. 4 is a view illustrating an internal structure of the transmission lever illustrated in FIG. 3, and FIG. 5 is a view illustrating a guide illustrated in FIG. 4 from a different angle from that shown in FIG. 4.

Referring to FIG. 3, the vehicle 1 according to some embodiments of the present disclosure may include the transmission lever 100 configured to receive a change speed command and a transmission apparatus (not shown) configured to change a speed of the vehicle 1 according to the change speed command received by the transmission lever 100. The transmission lever 100 may be provided to be located at any one gear position among a reverse (R) gear position, a neutral (N) gear position, and a driving (D) gear position. Alternately, while the transmission lever 100 is located at the N gear position, the transmission lever 100 may be provided to be rotatable in a front-rear direction within a predetermined angle range to receive a change D speed command and a change R speed command. Meanwhile, the vehicle 1 may include a change button 104 provided in addition to the transmission lever 100. The change button 104 may be touched or pushed to receive a change parking (P) speed command.

The transmission lever 100 may include a knob 101 provided such that a driver grips the knob 101 to input the change speed command, and a driving device 102 configured to provide and transfer a driving force for changing a shape of the knob 101. The transmission lever 100 may include a shaft 103, and the shaft 103 may be provided to be connected to the transmission apparatus.

Referring to FIG. 4, the transmission lever 100 may include a driving motor 110 configured to provide a driving force and a fixed gear 111 connected to the driving motor 110. The fixed gear 111 may be provided to rotate about a fixed rotating axis. The fixed rotating axis refers to a driving shaft (not shown) for transferring a driving force of the driving motor 110.

The transmission lever 100 may include moving shafts 120 provided to receive the driving force of the driving motor 110 and move.

Moving gears 121 may be coupled to one end of the moving shafts 120. The moving gears 121 may be engaged with the fixed gear 111. When the fixed gear 111 is rotated by the driving motor 110, the moving gears 121 engaged with the fixed gear 111 may be rotated. Here, the moving shafts 120 may include auxiliary gears 122 such that the moving shafts 120 are moved by the rotation of the moving gear 121.

The auxiliary gears 122 may be disposed adjacent to the moving gears 121 and may be disposed at one surface and another surface of a guide 130 with respect to the guide 130.

The guide 130 may be formed as a plate having a circular shape and coupled to the one side of each of the moving shafts 120. The guide 130 may include guide grooves 131 forming moving paths of the moving shafts. According to some embodiments of the present disclosure, a plurality of guide grooves 131 may be provided. The number of the guide grooves 131 may be provided to correspond with the number of the moving shafts 120. As illustrated in FIG. 4, for example, three moving shafts 120 and three guide groove 131 may be provided. Meanwhile, a pair of guides may be provided and referred to as a first guide 130 and a second guide 134. The first guide 130 and the second guide 134 may be disposed to face each other.

A connector 133b configured to connect the first guide 130 and the second guide 134 may be interposed between the first guide 130 and the second guide 134. Since the connector 133 is provided, the second guide 134 may be disposed in the air.

As illustrated in FIGS. 4 and 5, the fixed gear 111 and the moving gears 121 may be disposed on the one surface of the first guide 130, and guide rails 132 including saw teeth and the auxiliary gears 122 may be disposed on the other surface of the first guide 130. The guide rails 132 and the auxiliary gears 122 may be provided to be engaged with each other. Since the guide rails 132 and the auxiliary gears 122 are provided, the moving gears 121 can move along the guide grooves 131 without rotating in place.

Meanwhile, since a shape of the knob 101 of the transmission lever 100 according to the present disclosure is changed, the knob 101 and the shaft 103 may not be directly connected. The shaft 103 may include a first bent part 103a and a second bent part 103b to be connected to the first guide 130. The first guide 130 and the shaft 103 may be integrally formed.

The transmission lever 100 may include an elastic cover 140 forming an exterior of the knob 101. The elastic cover 140 may cover the moving shafts 120 and the first and second guides 130 and 134.

Figure 6:
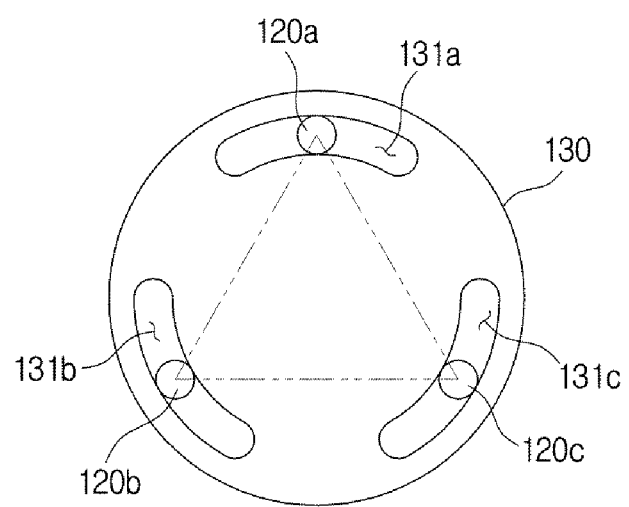
FIGS. 6 to 8 are cross-sectional views illustrating a knob according to gear positions at which a transmission lever is located in a vehicle according to exemplary embodiments of the present disclosure.
Figure 7:
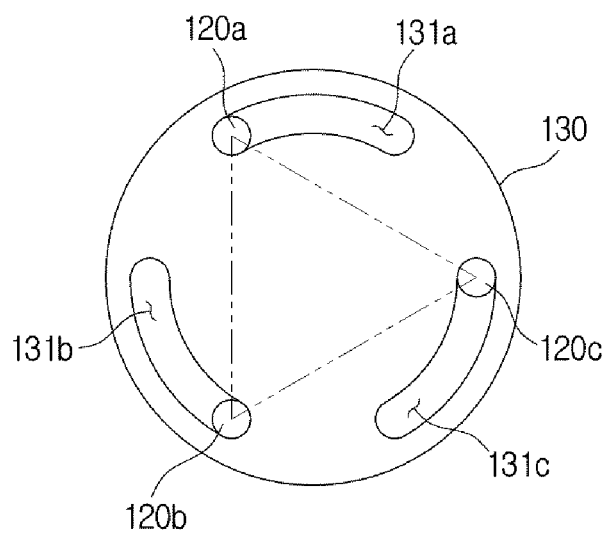
Figure 8:
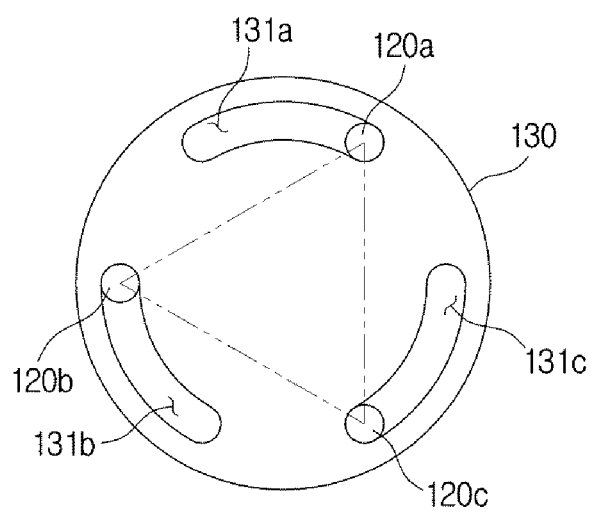

FIGS. 6 to 8 are cross-sectional views illustrating the knob according to gear positions at which the transmission lever is located in the vehicle according to some embodiments of the present disclosure.

Hereinafter, in the vehicle according to one embodiment of the present disclosure, a knob which changes a shape thereof on the basis of a gear position will be described in detail.

According to one embodiment of the present disclosure, the knob 101 of the transmission lever 100 may have a first shape, a second shape, or a third shape according to a gear position at which the transmission lever 100 is located. First, second, and third guide grooves 131a, 131b and 131c may be provided in the guide 130. One end of first, second, third moving shafts 120a, 120b, and 120c may be inserted into the first, second, third guide grooves 131a, 131b, and 131c.

In some embodiments, a cross section of the knob 101 illustrated in FIG. 6 is referred to as the first shape, a cross section of the knob 101 illustrated in FIG. 7 is referred to as the second shape, and a cross section of the knob 101 illustrated in FIG. 8 is referred to as the third shape.

The first shape may be a shape of the knob 101 when the transmission lever 100 is located at the N gear position, and the second shape may be a shape of the knob 101 when the transmission lever 100 is located at the D gear position. The third shape may be a shape of the knob 101 when the transmission lever 100 is located at the R gear position. However, these are only examples, and a combination of a shape and a gear position may be changed to various extents.

Before the vehicle 1 is started, the shape of the cross section of the knob 101 may be maintained as the first shape. After the vehicle 1 is started and before a speed thereof is changed, the first shape may be maintained.

When a driver positions the transmission lever 100 at the D gear position to move the vehicle 1 forward, the cross-sectional shape of the knob 101 may be changed to the second shape. Here, a driving force may be transferred from the above-described driving motor 110 to the fixed gear 111 and the moving gears 121.

The moving gear 121 may move in a first direction due to the driving force transferred thereto from the driving motor 110, the moving shafts 120 coupled to the moving gears 121 may move in the first direction, and the cross section of the knob 101 may be changed to the second shape. Meanwhile, the first direction may denote a counterclockwise direction based on FIGS. 6 to 8.

When the driver positions the transmission lever 100 at the R gear position to move the vehicle 1 backward, the cross-sectional shape of the knob 101 may be changed to the third shape. Here, the driving force may be transferred from the above-described driving motor 110 to the fixed gear 111 and the moving gears 121. The moving gears 121 moves in a second direction opposite the first direction due to the driving force transferred thereto from the driving motor 110, the moving shafts 120 coupled to the moving gears 121 may move in the second direction, and the cross section of the knob 101 may be changed to the third shape. Meanwhile, the second direction may denote a clockwise direction based on FIGS. 6 to 8.

As described above, according to some embodiments of the present disclosure, the shape of the knob 101 may be changed to any one among the first to third shapes according to a gear position at which the transmission lever 100 is located. A driver can recognize a current gear position by only griping the knob 101 of the transmission lever 100. More specifically, the driver may recognize the current gear position using a sense of touch without line-of-sight dispersion by gripping the knob 101 configured to have different shapes based on the gear position. Through this, the driver's convenience may be improved and an accident due to the line-of-sight dispersion may be prevented in advance as well.

Figure 9:
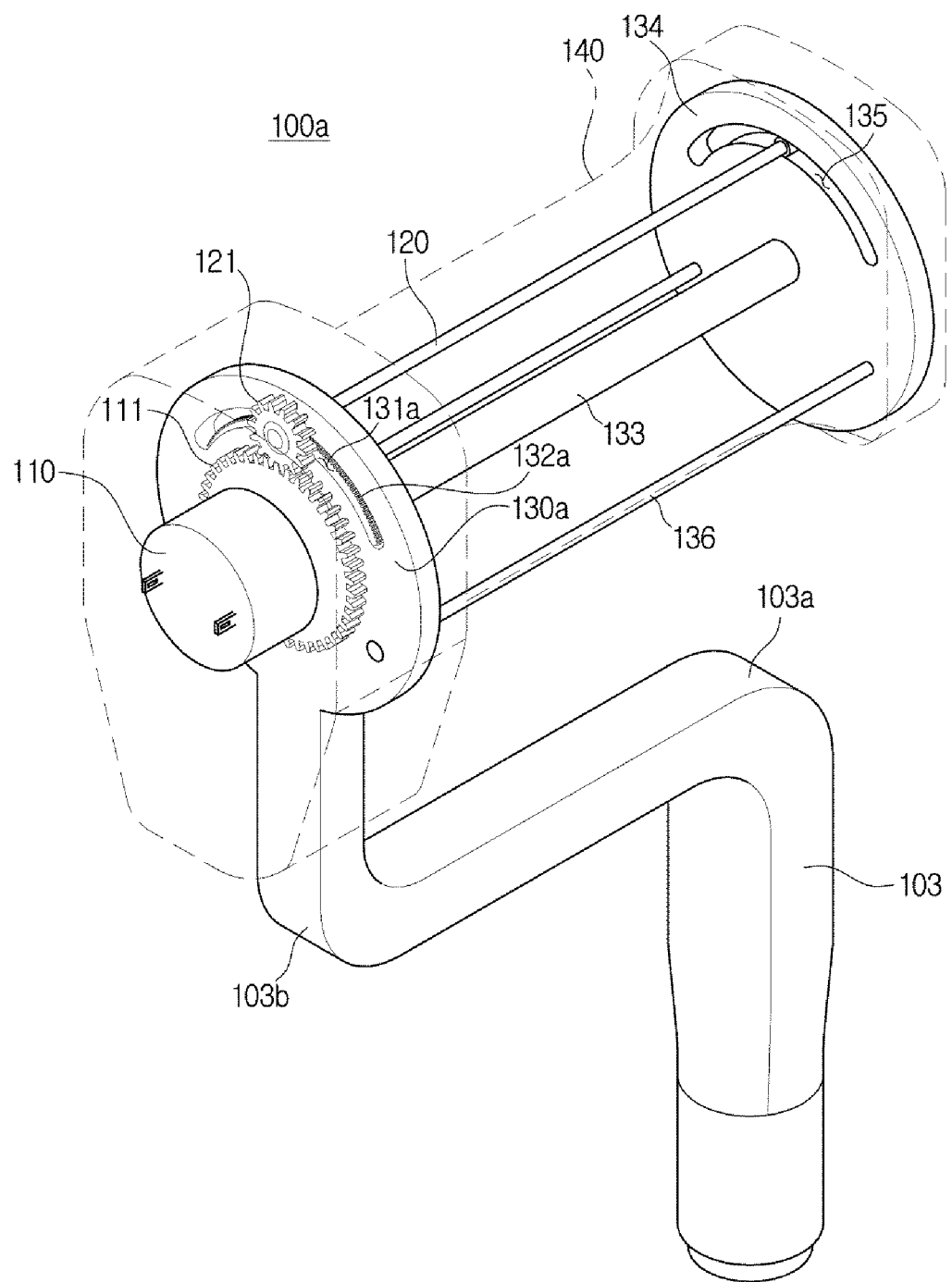
FIG. 9 is a view illustrating an internal structure of a transmission lever according to exemplary embodiments of the present disclosure.

FIG. 9 is a view illustrating an internal structure of a transmission lever according to exemplary embodiments of the present disclosure.

As illustrated in FIG. 9, a transmission lever 100a according to another embodiment of the present disclosure may include one moving shaft 120. In addition, the transmission lever 100a may include fixed shafts 136. A plurality of fixed shafts 136 may be provided. Meanwhile, in the case in which the one moving shaft 120 is provided, a moving range of the moving shaft 120 may increase. To this end, both ends of a guide groove 131a may extend.

The remaining components other than the above-described components are the same as the components illustrated in FIGS. 4 to 8, and repeated descriptions thereof will be omitted.

Figure 10:
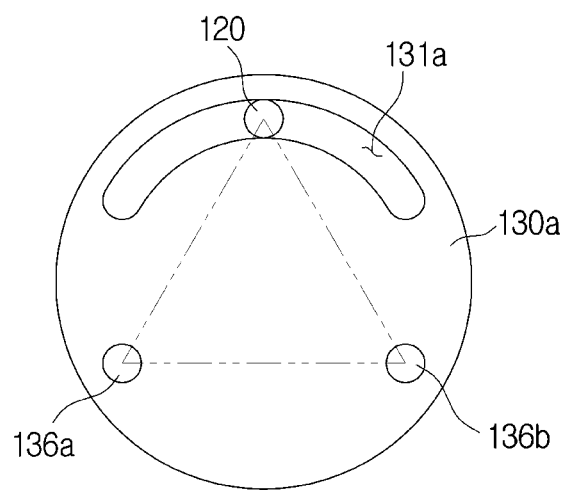
FIGS. 10 to 12 are cross-sectional views illustrating a knob according to gear positions at which a transmission lever is located in a vehicle according to exemplary embodiments of the present disclosure.
Figure 11:
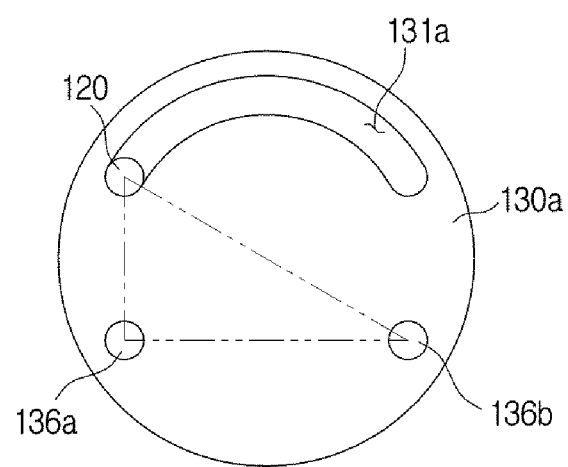
Figure 12:
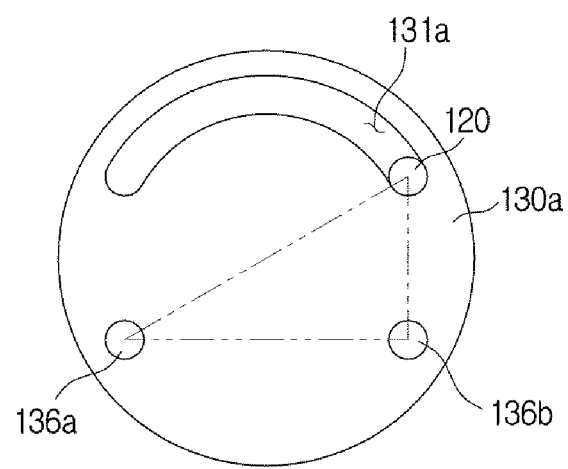

FIGS. 10 to 12 are cross-sectional views illustrating a knob according to gear positions at which a transmission lever is located in the vehicle according to another embodiment of the present disclosure.

Hereinafter, a knob of a vehicle according to another embodiment of the present disclosure having a shape thereof changed on the basis of a gear position will be described.

According to some embodiments of the present disclosure, a knob 101 of a transmission lever 100 may have a first shape, a second shape, and a third shape according to a gear position at which the transmission lever 100 is located. A guide groove 131 may be provided in a guide 130a, and one end of a moving shaft 120 may be inserted into the guide groove 131.

In the present embodiment, a cross section of the knob 101 illustrated in FIG. 10 is referred to as the first shape, a cross section of the knob 101 illustrated in FIG. 11 is referred to as the second shape, and a cross section of the knob 101 illustrated in FIG. 12 is referred to as the third shape.

The first shape may be a shape of the knob 101 when the transmission lever 100a is located at an N gear position, and the second shape may be a shape of the knob 101 when the transmission lever 100a is located at a D gear position. The third shape may be a shape of the knob 101 when the transmission lever 100a is located at an R gear position. However, these are only examples, and a combination of a shape and a gear position may be changed to various extents.

Before a vehicle 1 is started, the cross-sectional shape of the knob 101 may be maintained as the first shape. After the vehicle 1 is started and before a speed thereof is changed, the first shape may be maintained.

When a driver positions the transmission lever 100a at the D gear position to move the vehicle 1 forward, the cross-sectional shape of the knob 101 may be changed to the second shape. Here, a driving force may be transferred from the above-described driving motor 110 to a fixed gear 111 and a moving gear 121. The moving gear 121 may move in a first direction due to the driving force transferred thereto from driving motor 110, the moving shaft 120 coupled to the moving gear 121 moves in the first direction, and the cross section of the knob 101 may be changed to the second shape. Meanwhile, the first direction may denote a counterclockwise direction based on FIGS. 10 to 12.

When the driver positions the transmission lever 100 at the R gear position to move the vehicle 1 backward, the cross-sectional shape of the knob 101 may be changed to the third shape. Here, the driving force may be transferred from the above-described driving motor 110 to the fixed gear 111 and the moving gear 121. The moving gear 121 moves in a second direction opposite to the first direction due to the driving force transferred thereto from the driving motor 110, the moving shaft 120 coupled to the moving gear 121 moves in the second direction, and the cross section of the knob 101 may be changed to the third shape. Meanwhile, the second direction may denote a clockwise direction based on FIGS. 10 to 12.

Since the cross-sectional shape of the knob 101 is changed according to a gear position, the driver can recognize a current gear position using only a sense of touch. Through this, an accident due to line-of-sight dispersion, or distraction, can be prevented, as described above.

Figure 13:
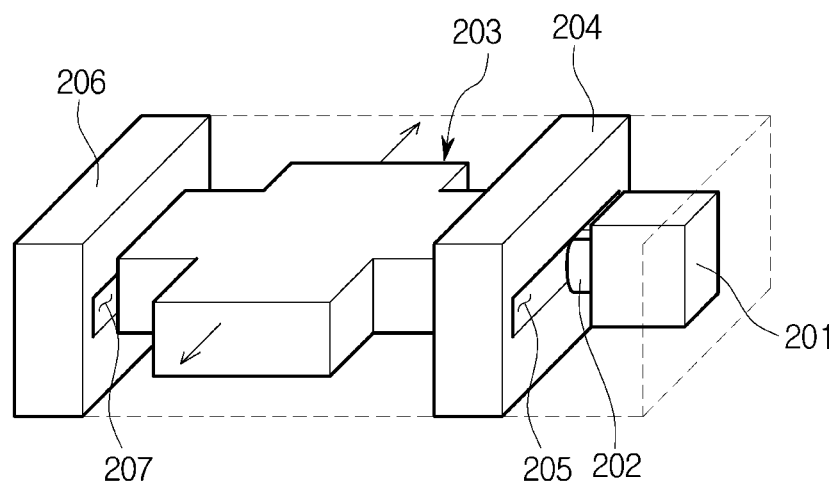
FIG. 13 is a view illustrating an internal structure of a transmission lever of a vehicle according to exemplary embodiment of the present disclosure.

FIG. 13 is a view illustrating an internal structure of a transmission lever of a vehicle according to still another embodiment of the present disclosure.

According to still another embodiment of the present disclosure, the transmission lever may include a driving motor 201, a first force transfer device 202 connected to the driving motor 201 to receive a driving force, a mover 203 provided to receive the driving force of the driving motor 201 to move forward or backward, an installation groove 205 in which a second force transfer device (not shown) configured to transfer the driving force received from the first force transfer device 202 to the mover 203 is formed, and a guide block 204 in which the installation groove 205 is formed. The transmission lever may further include a support block 206 disposed to face the guide block 204 and connected to one end of the mover 203. In the support block 206, a moving path may be formed so that the mover 203 may move forward or backward, and an insertion groove 207 into which the one end of the mover 203 is inserted may be formed.

When the driving motor 201 operates, a driving force of the driving motor 201 may be transferred to the mover 203 through the first force transfer device 202 and the second force transfer device (not shown). The driving motor 201 may provide the driving force in a first direction or second direction opposite the first direction. The mover 203 may move forward or backward according to the direction of the driving force provided by the driving motor 201.

The transmission lever may include an elastic cover (a reference number is not shown) configured to cover the mover 203, and a shape of an upper surface of the transmission lever may be changed according to the movement of the mover 203.

Figure 14:
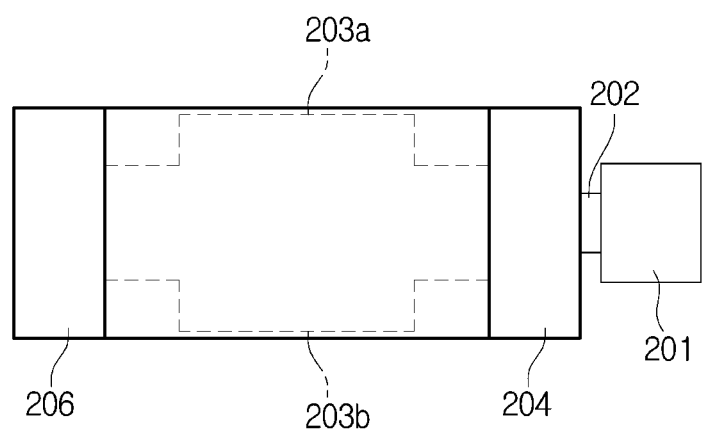
FIGS. 14 to 16 are views illustrating an upper surface of a knob according to gear positions at which a transmission lever is located in a vehicle according to exemplary embodiments of the present disclosure.
Figure 15:
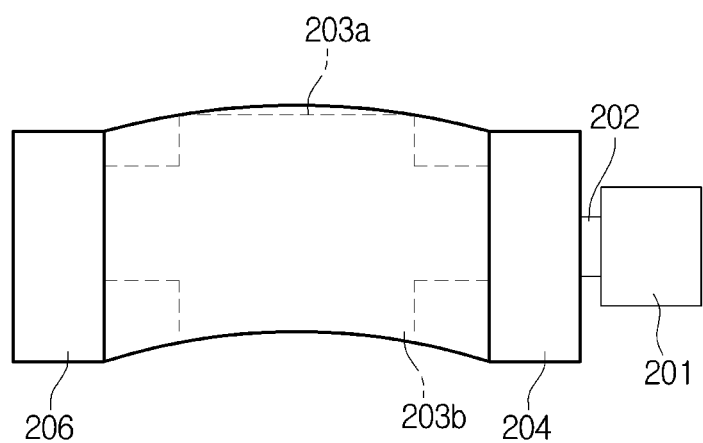
Figure 16:
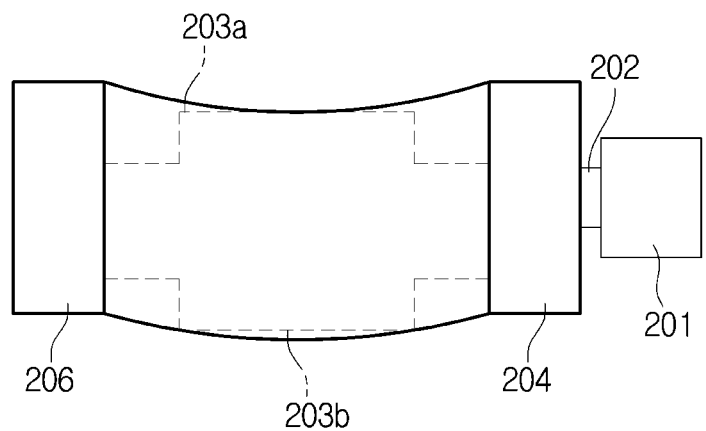

FIGS. 14 to 16 are views illustrating an upper surface of a knob according to gear positions at which a transmission lever is located in a vehicle according to still another embodiment of the present disclosure.

In the present embodiment, a shape of the upper surface of the knob illustrated in FIG. 14 is referred to as a first shape, a shape of the upper surface of the knob illustrated in FIG. 15 is referred to as a second shape, and a shape of the upper surface of the knob illustrated in FIG. 16 is referred to as a third shape.

The first shape may be a shape of the knob when the transmission lever is located at an N gear position, the second shape may be a shape of the knob when the transmission lever is located at a D gear position. The third shape may be a shape of the knob when the transmission lever is located at an R gear position. However, these are only examples, and a combination of a shape and a gear position may be changed to various extents.

Before the vehicle 1 is started, the shape of the upper surface of the knob may be maintained as the first shape. After the vehicle 1 is started and before a speed thereof is changed, the first shape may be maintained.

When a driver positions the transmission lever at a D gear position to move the vehicle 1 forward, a shape of the upper surface of the knob may be changed to the second shape. Here, a driving force may be transferred from the above-described driving motor 201 to the mover 203 through the first force transfer device 202. The mover 203 moves forward due to the driving force transferred thereto from the driving motor 110, and the shape of the upper surface of the knob may be changed to the second shape When the driver positions the transmission lever at the R gear position to move the vehicle 1 backward, a shape of the upper surface of the knob may be changed to the third shape. Here, the driving force may be transferred from the above-described driving motor 201 to the mover 203 through the first force transfer device 202. The mover 203 moves backward due to the driving force transferred thereto from the driving motor 201, and the shape of the upper surface of the knob may be changed to the third shape.

Even when a cross-sectional shape of the knob is not changed and the shape of the upper surface thereof is changed, the driver can detect the shape using a sense of touch. Accordingly, the driver may recognize a current gear position using only the sense of touch similarly to the above-described embodiments. Therefore, while traveling, the driver can recognize the gear position without line-of-sight dispersion, and thus an accident can be prevented or the driver's convenience can be improved.

As is apparent from the above description, a vehicle including a transmission apparatus which allows a driver to check a current gear position using only a sense of touch can be provided.

A vehicle including a transmission apparatus of which a shape of a transmission lever is changed according to a gear change can be provided.

A vehicle including a transmission apparatus which allows a driver to grip a transmission lever in order to check a current gear position without line-of-sight dispersion can be provided.

Although a few embodiments of the present disclosure have been shown and described above, the disclosure is not limited to the aforementioned specific exemplary embodiments. Those skilled in the art may variously modify the disclosure without departing from the concepts of the disclosure claimed in the appended claims.

What is claimed is:

1. A vehicle comprising:
   a transmission lever for receiving a change speed command and including a knob; and
   a transmission apparatus for changing a speed of the vehicle according to the change speed command received by the transmission lever,
   wherein the transmission lever is located at any one gear position among a reverse (R) gear position, a neutral (N) gear position and a driving (D) gear position, and a cross-sectional shape of the knob is changed according to the gear position at which the transmission lever is located,
   wherein the transmission lever includes:
      a driving motor for providing a driving force; and
      a moving shaft connected to the driving motor and movable in a first direction or a second direction opposite the first direction,
   wherein the driving force of the driving motor causes the knob to change shape on the basis of the gear position at which the transmission lever is located.

2. The vehicle of claim 1, wherein, when the transmission lever is located at any one gear position among the R gear position, the N gear position, and the D gear position, the moving shaft is provided to be located at corresponding one among a first position, a second position and a third position.

3. The vehicle of claim 1, wherein the moving shaft is provided with a plurality of moving shafts.

4. The vehicle of claim 1, wherein the transmission lever further includes an elastic cover covering the moving shaft and forming the knob together with the moving shaft.

5. The vehicle of claim 1, wherein the transmission lever includes:
   a fixed gear connected to the driving motor and rotating about a fixed axis; and
   a moving gear engaged with the fixed gear, coupled to one end of the moving shaft, and rotating about a moving axis together with the moving shaft.

6. The vehicle of claim 1, further comprising a change button for receiving a parking (P) change speed command, the change button being located remotely from the transmission lever.

7. A vehicle comprising:
   a transmission lever for receiving a change speed command and including a knob; and
   a transmission apparatus for changing a speed of the vehicle according to the change speed command received by the transmission lever,
   wherein the transmission lever is located at any one gear position among a reverse (R) gear position, a neutral (N) gear position and a driving (D) gear position, and a cross-sectional shape of the knob is changed according to the gear position at which the transmission lever is located,
   wherein the transmission lever includes:
      a driving motor for providing a driving force; and
      a moving shaft connected to the driving motor and movable in a first direction or a second direction opposite the first direction,
   wherein the driving force of the driving motor causes the knob to change shape on the basis of the gear position at which the transmission lever is located, and
   wherein the first direction corresponds to a clockwise direction and the second direction corresponds to a counterclockwise direction.

8. A vehicle comprising:
   a transmission lever for receiving a change speed command and including a knob; and
   a transmission apparatus for changing a speed of the vehicle according to the change speed command received by the transmission lever,
   wherein the transmission lever is located at any one among a reverse (R) gear position, a neutral (N) gear position and a driving (D) gear position, and the knob moves as a function of the gear position at which the transmission lever is located,
   wherein the transmission lever further includes a driving motor for providing a driving force; and
   the knob moves forward or backward relative to the transmission lever due to the driving force of the driving motor on the basis of the gear position at which the transmission lever is located.

9. The vehicle of claim 8, wherein the knob moves forward or backward on the basis of the gear position at which the transmission lever is located.

10. The vehicle of claim 8, further comprising a change button for receiving a parking (P) change speed command, the change button being located remotely from the transmission lever.

* * * * *